(12) United States Patent
Yang et al.

(10) Patent No.: US 12,467,738 B2
(45) Date of Patent: Nov. 11, 2025

(54) METHOD AND SYSTEM FOR HIGH-PRECISION LOCALIZATION OF SURFACE OF OBJECT

(71) Applicant: Sun Yat-sen University, Guangzhou (CN)

(72) Inventors: Xia Yang, Guangzhou (CN); Junyou Qin, Guangzhou (CN); Guisong Guo, Guangzhou (CN); Xiaohu Zhang, Guangzhou (CN)

(73) Assignee: Sun Vat-sen University, Guangzhou (CN)

( * ) Notice: Subject to any disclaimer, the term of this patent is extended or adjusted under 35 U.S.C. 154(b) by 0 days.

(21) Appl. No.: 18/032,342

(22) PCT Filed: Nov. 25, 2021

(86) PCT No.: PCT/CN2021/133252
§ 371 (c)(1),
(2) Date: Apr. 18, 2023

(87) PCT Pub. No.: WO2023/060717
PCT Pub. Date: Apr. 20, 2023

(65) Prior Publication Data
US 2024/0369346 A1 Nov. 7, 2024

(30) Foreign Application Priority Data
Oct. 13, 2021 (CN) .......................... 202111193896.6

(51) Int. Cl.
G01B 11/00 (2006.01)
G01B 11/26 (2006.01)
G06T 7/73 (2017.01)

(52) U.S. Cl.
CPC ............ *G01B 11/002* (2013.01); *G01B 11/26* (2013.01); *G06T 7/73* (2017.01); *G06T 2207/30204* (2013.01)

(58) Field of Classification Search
CPC ....... G01B 11/002; G01B 11/26; G01B 11/00; G01B 11/02; G01B 11/03; G06T 7/73;
(Continued)

(56) References Cited

U.S. PATENT DOCUMENTS

2021/0310794 A1* 10/2021 Fuchs .................... G01B 5/004

FOREIGN PATENT DOCUMENTS

| CN | 101526337 | * | 1/2011 | |
| CN | 105627948 | * | 2/2018 | ............ G01B 11/24 |

(Continued)

*Primary Examiner* — Jerome Grant, II
(74) *Attorney, Agent, or Firm* — Jose Cherson Weissbrot

(57) ABSTRACT

The present disclosure provides a method and system for high-precision localization of a surface of an object, the method including making marks with a pre-set distribution density on the surface of the object; photographing the marked object and numbering the marks in the image; acquiring relative position information about each mark on the surface of the object and establishing a corresponding relationship between mark numbers and mark position information; acquiring a real-time to be-measured image and detecting marks in the real-time to-be measured image; and calculating to obtain a position of the surface of the object corresponding to the current real-time to be-measured image. The system includes a mark making module, a numbering module, a mark position relationship module, a to-be measured image module and a physical quantity calculation module.

8 Claims, 5 Drawing Sheets

(58) Field of Classification Search
CPC ......... G06T 2207/30204; G06T 3/4038; G06T 7/46; G06T 2207/20221; G06F 18/213; G06F 18/2135
USPC .......................................................... 382/103
See application file for complete search history.

(56) References Cited

FOREIGN PATENT DOCUMENTS

| | | | |
|---|---|---|---|
| JP | H05296739 | * | 11/1993 |
| JP | 2009282040 | * | 12/2009 |
| RU | 2370820 C1 | * | 10/2009 |

* cited by examiner

METHOD AND SYSTEM FOR HIGH-PRECISION LOCALIZATION OF SURFACE OF OBJECT

TECHNICAL FIELD

The present disclosure relates to the field of measurement technology, in particular to a method and system for high-precision localization of a surface of an object.

BACKGROUND

High-precision localization of a surface of an object is significant in the field of measurement. Through the high-precision localization of the surface of the object, displacement or rotation of the object can be directly measured with high precision, and then the high-precision displacement or rotation angle data can be provided for precision instruments, precision equipment or high-precision weapon equipment and the like. Such technologies can be widely used in the fields including robot, aerospace equipment, photoelectric theodolite, radar, numerical control machine and various industrial automation equipment, which is of great significance to national defense, aerospace, precision manufacturing and automation industries and the like.

At present, most of the methods of high-precision localization of a surface of an object mainly need to rely on grating. The grating measurement technique is a technique for precision measurement using Moire fringes. The measurement principle is as follows: Moire fringes are generated when two gratings overlap and can amplify the relatively small displacement of the two gratings. By measuring the relevant information of Moire fringes, high-precision localization of the gratings can be achieved, thus achieving high-precision measurement of displacement or angle. Although grating measurement technology has the advantages including small volume, high-precision and strong anti-interference ability, the requirements for materials and technology are very high, which brings great difficulty for making and machining. Even if the machining and making of the high-precision grating is completed, the grating measurement technology is still restricted by various factors in practical application, and the actual measurement accuracy is greatly affected, such as the impact of encoder optical parts, such as motherboard error and reticle error of a coded disc, mechanical parts, such as bearings and structures, and electrical parts, such as light emission source and receiving unit, and the impact of signal delay in the use of an encoder.

SUMMARY

In order to solve the above-mentioned technical problems, it is an object of the present disclosure to provide a method and system for high-precision localization of a surface of an object, wherein the algorithm is a semi-supervised learning method, and a high-precision measurement of parameters such as a two-dimensional translation, a three-dimensional translation and a two-dimensional rotation angle of an object can be achieved by photographing a self-contained feature or a texture feature of the surface of the object by a single camera.

A first technical solution adopted by the present disclosure is: a method for high-precision localization of a surface of an object, comprising the following steps of: making marks with a pre-set distribution density on the surface of the object to obtain a marked object, wherein the marks made shall comply with the following settings: 1. make sure the background images of different marks in the image have a certain degree of discrimination after imaging the surface of the object, so that the marks can be quickly and reliably detected and identified from the image, and 2. it is necessary to achieve a certain distribution density of marks on the surface of the object to ensure that at least 1 complete mark exists in the imaging field of view when the camera captures any part of the surface of the object to be detected.

photographing the marked object and numbering marks in an image to obtain an image with numbered marks, wherein there are 3 different ways of naming and numbering, one of which can be selected as actually required: 1. performing naming and numbering according to image feature information about the marks, 2. performing naming and numbering according to random texture image information around the marks, and 3. performing naming and numbering on the information of the marks in conjunction with the image information about the texture around the marks.

acquiring relative position information about each mark on the surface of the object according to the image with the numbered marks and establishing a corresponding relationship between the mark numbers and the mark position information.

acquiring a real-time to-be-measured image and detecting marks in the real-time to-be-measured image to obtain to-be-measured marks, and calculating a position of the surface of the object corresponding to the current real-time to-be-measured image according to the position of the to-be-measured marks in the real-time to-be-measured image and the position information of the surface of the object corresponding to the marks.

Further, the step of making marks with a pre-set distribution density on the surface of the object to obtain a marked object specifically comprises:

engraving marks on the surface through a mark making method using marks of a pre-set pattern to obtain a marked object, wherein the marks of a pre-set pattern comprise a line segment, a point, a circle, a square, a cross and a shape of combination thereof.

the mark making method comprises laser engraving, printing, and etching. and the marks have an engraving pitch less than half of the image frame.

Further, the step of photographing the marked object and numbering marks in an image to obtain an image of the surface with numbered marks specifically comprises:

photographing and imaging the surface of the marked object to obtain a surface image.

processing the surface image through threshold segmentation to detect and obtain the target centers of all the marks in the surface image.

taking the target center as a reference point, taking an image of a pre-set pixel size as a mark feature image of corresponding marks.

establishing a corresponding relationship between the mark feature image and the mark numbers using a principal component analysis method, reducing the mark feature image to a low dimension, and taking the first 10 principal components of a principal component matrix as a one-dimensional vector representing the marks to determine a unique number. and, obtaining an image of the surface with numbered marks.

Further, the step of acquiring relative position information about each mark on the surface of the object according to the image with the numbered marks and establishing a corresponding relationship between the mark numbers and the mark position information specifically comprises:

performing image stitching on the image with numbered marks through an image stitching method to obtain a complete surface image.

taking the complete surface image as a reference image and establishing a relationship between the image pixel coordinates of the reference image and the actual coordinates of the surface of the object. and identifying and localizing marks on the reference image, and determining the corresponding relationship between each mark and a coordinate of the surface of the object according to the relationship between the pixel coordinate of the reference image and the actual coordinate of the surface of the object.

Further, the step of acquiring a real-time to-be-measured image and detecting marks in the real-time to-be-measured image to obtain to-be-measured marks specifically comprises:

determining the precise position of each mark central point on the surface of the object according to a transformation formula.

performing real-time imaging on the surface of the object to obtain a real-time to-be-measured image. and performing mark detection on the real-time to-be-measured image, and confirming mark numbers corresponding to the marks in the real-time to-be-measured image based on vector comparison.

Further, the transformation formula is as follows:

$$s\begin{bmatrix}u\\v\\1\end{bmatrix}=\begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}x_w\\y_w\\z_w\\1\end{bmatrix}$$

In the above formula, s is a Z coordinate having a central point in a camera coordinate system, (u, v) is an image coordinate of the center, ($f_x$, $f_y$) is an equivalent focal length of the camera, ($c_x$, $c_y$) is an image main point, $r_{ij}$=(i, j=1, 2, 3) is a rotation matrix R element, $t_i$=(i=1, 2, 3) is a translation vector, and ($x_w$, $y_w$, $z_w$) represents a three-dimensional point coordinate corresponding to the surface of the object and the mark center.

Further, the step of calculating a position of the surface of the object corresponding to the current real-time to-be-measured image according to the position of the to-be-measured marks in the real-time to-be-measured image and the position information of the surface of the object corresponding to the marks specifically comprises:

acquiring the corresponding coordinate of the real-time image center on the reference image according to the mark number.

determining a point of the surface of the object corresponding to the real-time image center according to the corresponding relationship between a pixel coordinate of the reference image and a parameter of the surface of the object and a coordinate of the real-time image center on the reference image. and obtaining a position of the surface of the object corresponding to the current real-time to-be-measured image according to the point of the surface of the object corresponding to the real-time image center, wherein the position of the surface of the object corresponding to the current real-time to-be-measured image comprises a one-dimensional coordinate, a two-dimensional coordinate, a three-dimensional coordinate, a one-dimensional rotation angle and a two-dimensional rotation angle.

Further, the step of calculating a position of the surface of the object corresponding to the current real-time to-be-measured image according to the position of the to-be-measured marks in the real-time to-be-measured image and the position information of the surface of the object corresponding to the marks specifically comprises:

$$\theta=\frac{y_c-y_o}{L}*360°$$

In the above formula, θ is a rotation angle of a to-be-measured rotating body, $y_0$ is an origin of a circumferential line of an external surface expansion of the rotating body, $y_c$ is a coordinate point of the identification center of the external surface expansion of the rotating body, and L is a length of a circumferential line of the external surface expansion of the rotating body.

Further, the calculation formula of the two-dimensional rotation angle is as follows:

$$\begin{cases}a=a\tan\left(\frac{\sqrt{x_w^2+y_w^2}}{\sqrt{x_w^2+y_w^2+z_w^2}}\right)\\\beta=a\tan\left(\frac{x_w}{y_w}\right)\end{cases}$$

In the above formula, the coordinate of image center is (u, v) corresponding to a world coordinate on the surface of the to-be-measured sphere, which is recorded as ($x_w$, $y_w$, $z_w$). and α is the longitude of the to-be-measured sphere, and β is the latitude of the to-be-measured sphere.

The second technical solution adopted by the present disclosure is: a system for high-precision localization of a surface of an object, which comprises:

a mark making module configured to make marks with a pre-set distribution density on the surface of the object to obtain a marked object.

a numbering module configured to photograph the marked object and number marks in an image to obtain an image with numbered marks.

a mark position relationship module configured to acquire relative position information about each mark on the surface of the object according to the image with the numbered marks and establish a corresponding relationship between the mark numbers and the mark position information.

a to-be-measured image module configured to acquire a real-time to-be-measured image and detect marks in the real-time to-be-measured image to obtain to-be-measured marks. and, a physical quantity calculation module configured to calculate a position of the surface of the object corresponding to the current real-time to-be-measured image according to the position of the to-be-measured marks in the real-time to-be-measured image and the position information of the surface of the object corresponding to the marks.

Beneficial effects of the method and system of the disclosure are that: according to the present disclosure, a high-precision measurement of parameters such as a two-dimensional translation, a three-dimensional translation and a two-dimensional rotation angle of an object can be achieved by photographing a self-contained feature or a texture feature of the surface of the object by a single camera. The actual position of each mark relative to the to-be-measured object can be obtained with high precision by measuring the marks after making, and then the surface of the object can be localized and measured according to the actual position (rather than theoretical position) of the marks to avoid the influence of machining errors and installation errors and other factors of the marks on the measurement accuracy. Further, the present disclosure does not need to make and install an information ring, does not need to process, and make coded marks with high precision, and the method is simpler and more economical.

DETAILED DESCRIPTION

The present disclosure will now be described in further detail with reference to the accompanying drawings and specific examples. With regard to the step numbers in the following examples, which are provided only for ease of illustration, no limitation is placed on the order between the steps, and the order of execution of the steps in the examples can be adapted as understood by a person skilled in the art.

Implementations of the present disclosure are described in further detail in the context of a single line camera scanning a side of a frustum of a cone and the absence of an apparently random natural texture on the surface of the frustum of the cone.

Figure 1:
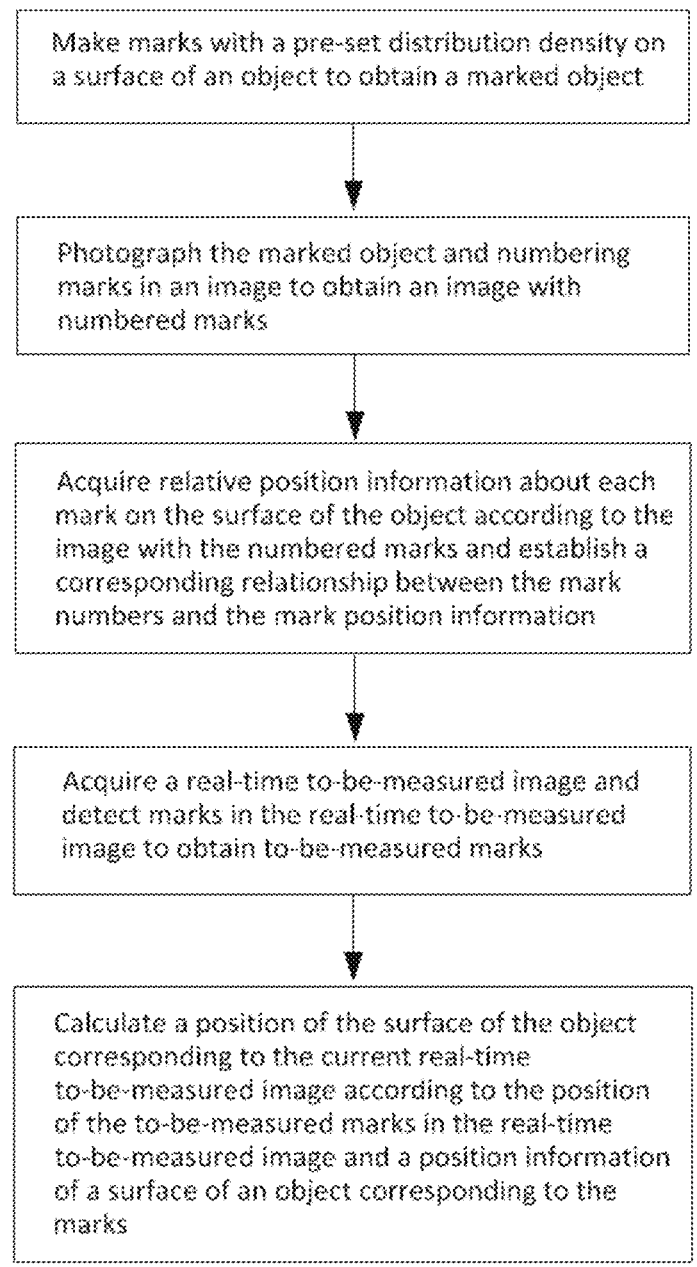
FIG. 1 is a flow chart showing the steps of a method for high-precision localization of a surface of an object according to the present disclosure.
Figure 4:
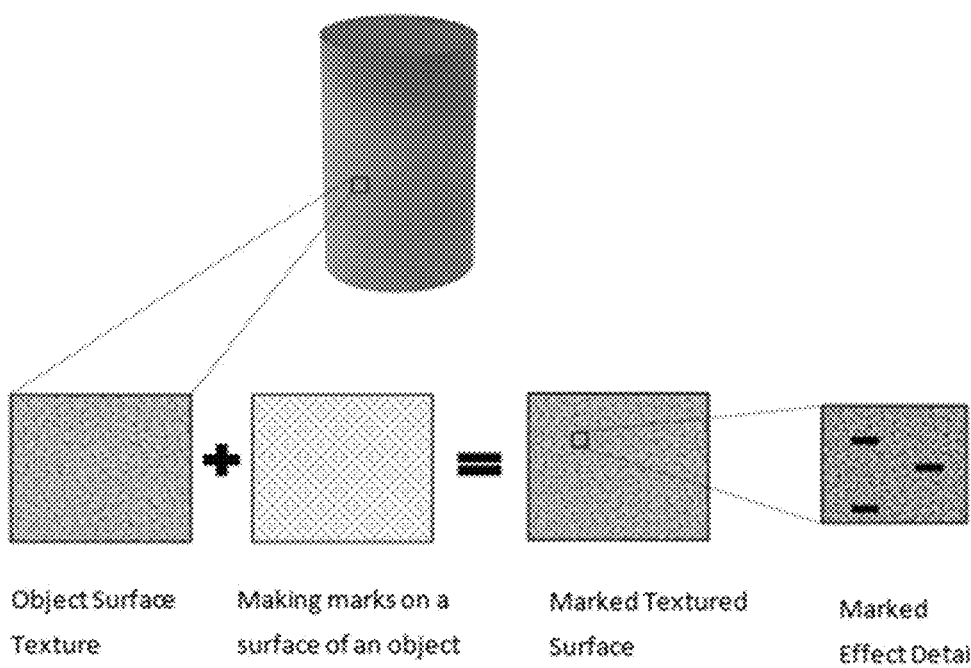
FIG. 4 is a schematic diagram showing making marks according to specific examples of the present disclosure.

Referring to FIG. 1, provided is a method for high-precision localization of a surface of an object, which includes the following steps of:

S1: making marks with a pre-set distribution density on the surface of the object to obtain a marked object, where specifically, as shown in FIG. 4, by means of a laser engraving technique, using a mark in a line segment pattern, a line segment is engraved on the surface of the object which has been made with a random texture, and the engraving pitch of the line segment is less than half of the image frame to ensure that there is at least 1 complete mark in the image when a surface of a to-be-measured object is imaged.

Figure 5:
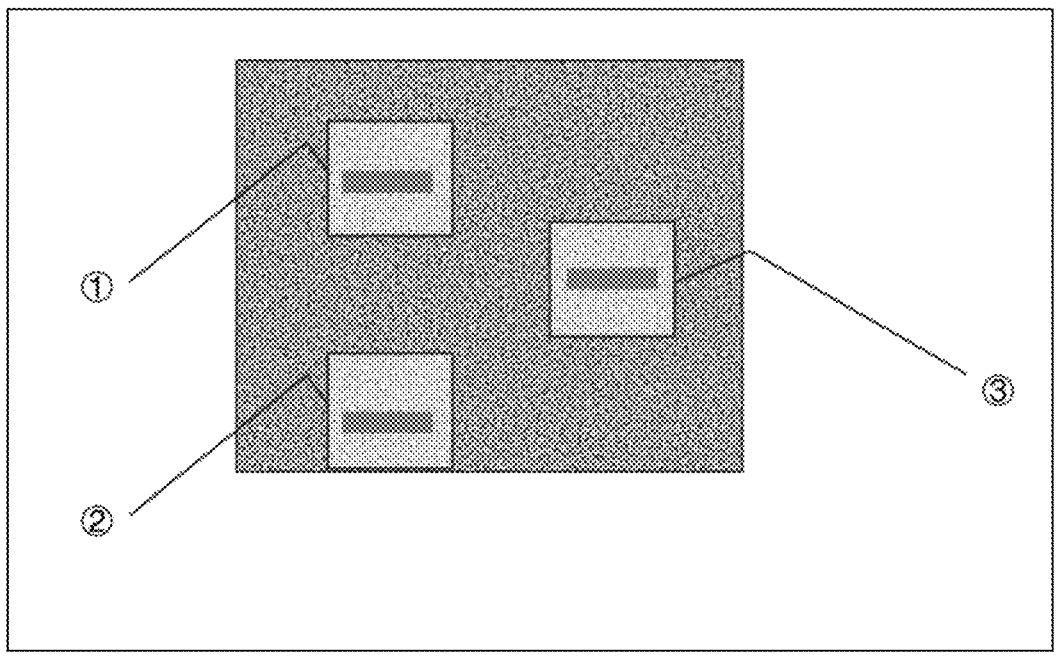
FIG. 5 is a schematic diagram showing naming and numbering according to specific examples of the present disclosure.

S2: photographing the marked object and numbering marks in an image to obtain an image with numbered marks, where specifically, all the marks on the surface of the object are imaged, and then the marks are detected through threshold segmentation for all the images, and the coordinates of the mark images are determined using a centroid method. a mark center is taken as a reference point to take an image of a certain range (such as 200×200 pixels) as a feature image corresponding to the mark (since the texture information is random, the feature image of each mark is different). and finally, a principal component analysis (PCA) method is used to distinguish and number the marked feature images, and FIG. 5 is referred for the numbering schematic diagram.

Figure 3:
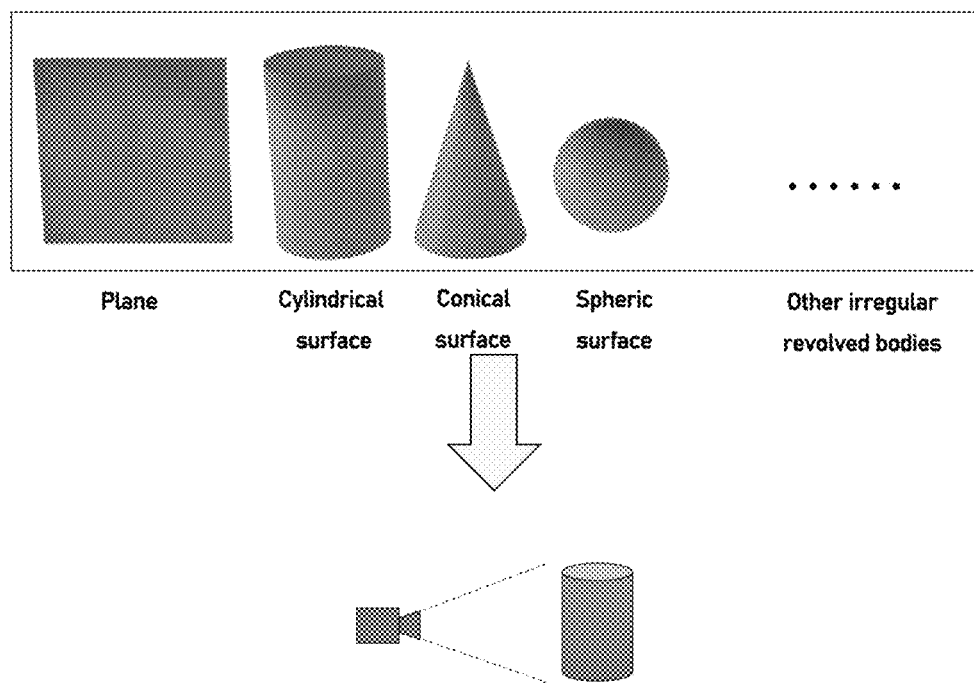
FIG. 3 is a schematic diagram showing a camera imaging according to specific examples of the present disclosure.

S3: acquiring relative position information about each mark on the surface of the object according to the image with the numbered marks and establishing a corresponding relationship between the mark numbers and the mark position information, where specifically, as shown in FIG. 3, for a frustum of a cone having a surface lacking a distinct random natural texture, a metal paint is firstly sprayed on the surface of the to-be-measured frustum of the cone, and the size of the metal particles is determined according to the physical resolution of image pixels, so that a random pattern of a speckle shape is generated after the surface of the object is imaged. then, an image with certain degree of overlap is made on each part of a side of the frustum of the cone, and a complete image showing a periphery of the frustum of the cone is obtained by an image stitching technology, which is used as a reference image. and a corresponding relationship between the image pixel coordinates of the reference image and the two-dimensional coordinates of the local area of the surface of the frustum of the cone is established.

The coordinate of each mark on the surface of the object can be directly measured using a three-coordinate measuring instrument or a stereo vision measuring technique to determine the corresponding relationship between each mark and the coordinates of the surface of the object.

S4: acquiring a real-time to-be-measured image and detecting marks in the real-time to-be-measured image to obtain to-be-measured marks.

Figure 6:
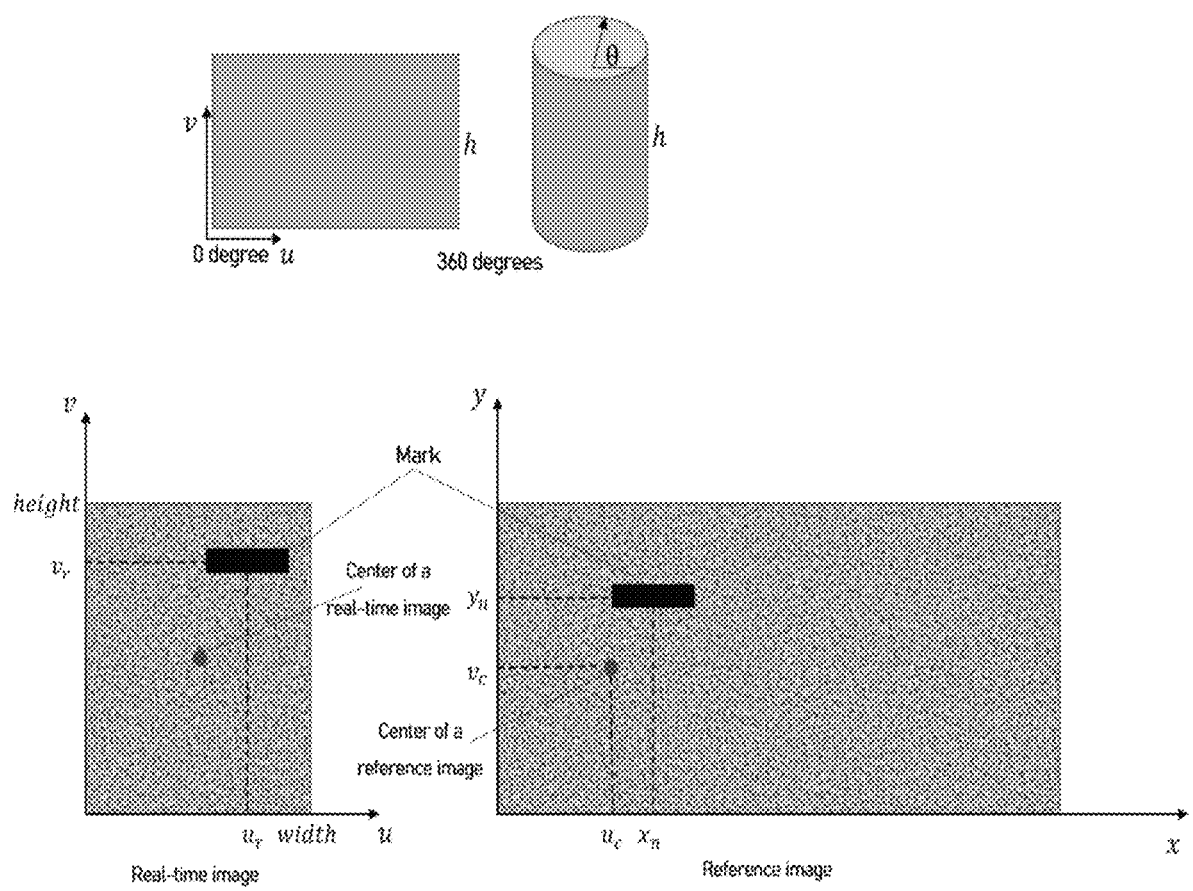
FIG. 6 is a schematic diagram showing calculation of physical quantities according to specific examples of the present disclosure.

S5: calculating a position of the surface of the object corresponding to the current real-time to-be-measured image according to the position of the to-be-measured marks in the real-time to-be-measured image and the position information of the surface of the object corresponding to the marks, specifically, referring to FIG. 6 for the physical quantity calculation.

As a further preferred example of the method, the step S2 of photographing the marked object and numbering marks in an image to obtain an image with numbered marks specifically includes:

S21: photographing and imaging the surface of the marked object to obtain a surface image.

S22: processing the surface image through threshold segmentation to detect and obtain the target centers of all the marks in the surface image, where specifically, the image is binarized by a threshold:

$$g(x, y) = \begin{cases} 0 & \text{if } f(x, y) \le Th \\ 255 & \text{if } f(x, y) > Th \end{cases}$$

In the formula, f(x, y) is an image gray value, x, y is a pixel coordinate, and Th is a threshold value. then region growing is performed on pixel points with a grey value of 255, and a target is confirmed according to the area of the target, and if the number of points with a grey value of 255 connected around the current pixel point is less than a threshold value $T_s$, then the current point is not the target. and on the contrary, if the number of points with a pixel value of 255 is greater than the threshold $T_s$, the current point is determined to be the target:

$$\text{Target} = \begin{cases} 0 & \text{if } S \le Ts \\ 1 & \text{if } S > Ts \end{cases}$$

centroid localization is performed on the confirmed target to obtain a target center, where the centroid is a coordinate center of each point with a pixel value of 255:

$$\begin{cases} x = \dfrac{1}{n}\sum x_i \\ y = \dfrac{1}{n}\sum y_i \end{cases}$$

where n is the number of points with a pixel value of 255 in the current target, and $(x_i, y_i)$ is the image coordinate of each point.

S23: taking the target center as a reference point, taking an image of a pre-set pixel size as a mark feature image of corresponding marks, where specifically, the target center is taken as a reference point, an image having a size of 200×200 pixels is taken as a feature image of the mark, and different marks can be distinguished by the feature image.

S24: establishing a corresponding relationship between the mark feature image and the mark numbers using a principal component analysis method, reducing the mark feature image to 10 dimensions, and taking the first 10 principal components of a principal component matrix as a one-dimensional vector representing the marks to determine a unique number, where specifically, a principal component analysis method is used to establish a corresponding relationship between a mark feature image and a mark number, and a mark feature image with a size of 200×200 pixels is reduced into a one-dimensional vector represented by 10 components, and the one-dimensional vector is used as a displacement number of the mark, and S25: obtaining an image of the surface with numbered marks.

Further, as a preferred example of the method, the step S24 specifically includes:

S241: subtracting the mean value of each row vector (each variable) of the 200×200 matrix from the row vector, so that the mean value of the new row vector is 0, and obtaining a new data set matrix X.

S242: solving a covariance matrix of X, and solving an eigenvalue A and a unit eigenvector e of the covariance matrix.

S243: arranging the unit eigenvectors into a matrix according to the order of the eigenvalues from large to small, obtaining a conversion matrix P, and calculating a principal component matrix according to PX, and S244: reducing the feature image to a specific 10 dimensions, and directly taking the first 10 principal components of the principal component matrix, and if there is no fixed requirement for representing the target dimension of the image, the variance contribution rate and the variance cumulative contribution rate can be calculated by using the eigenvalue, and taking the first 10 principal components with the maximum variance cumulative contribution rate, and these 10 principal components are a one-dimensional vector representing the marks, and determining the unique number by using the vector as the feature information of the mark.

As a further preferred example of the method, the step of acquiring relative position information about each mark on the surface of the object according to the image with the numbered marks and establishing a corresponding relationship between the mark numbers and the mark position information specifically includes:

S31: performing image stitching on the image with numbered marks through an image stitching method to obtain a complete surface image.

S32: taking the complete surface image as a reference image and establishing a relationship between the image pixel coordinates of the reference image and the actual coordinates of the surface of the object, and S33: identifying and localizing marks on the reference image, and determining the corresponding relationship between each mark and a coordinate of the surface of the object according to the relationship between the pixel coordinate of the reference image and the actual coordinate of the surface of the object, where specifically, assuming that the local area of the surface of a frustum of a cone is an approximate plane, the relationship between the image plane point and the two-dimensional point on the local area of the surface of the object can be represented as:

$$\begin{cases} x = au + bv + c \\ y = du + ev + f \end{cases}$$

where a, b, c, d, e, f are the 6 parameters describing the deformation between two planes, (u, v) is the image pixel coordinate, and (x, y) is the coordinate on the approximate plane of the surface of the frustum of the cone. and the deformation parameters can be acquired by simultaneous calculation of the surface control points $(u_i, v_i)$ of the object and the corresponding points $(x_i, y_i)$ of the image according to the following equation group:

$$\begin{cases} x_i = au_i + bv_i + c \\ y_i = du_i + ev_i + f \end{cases}$$

The direction of the reference map v corresponds to the height direction of the rotation shaft of the revolved body, and the direction of the reference map u corresponds to the rotation angle of the revolved body, and surface points of the frustum of the cone are denoted by their corresponding rotation shaft heights and rotation angles as (θ, h), and the corresponding relationship between the image coordinate (u, v) and the cylindrical side surface coordinate (θ, h) is:

$$\begin{cases} \theta = au \\ h = bv \end{cases}$$

where, a, b are proportional parameters, which can be acquired through camera calibration, and can also be obtained through the calculation of the following equation group obtained through the simultaneous connection of a surface of an object control point $(\theta_i, h_i)$ and the image corresponding point $(u_i, v_i)$:

$$\begin{cases} \theta_i = au_i \\ h_i = bv_i \end{cases}$$

Each mark is identified and localized on the reference image, and the corresponding relationship between each mark and a coordinate of the surface of the object is determined according to the relationship between the pixel coordinate of the reference image and the actual coordinate of the surface of the object.

As a further preferred example of the method, the step of acquiring a real-time to-be-measured image and detecting marks in the real-time to-be-measured image to obtain to-be-measured marks specifically comprises:

S41: determining the precise position of each mark central point on the surface of the object according to a transformation formula, where specifically, a precise position, such as a two-dimensional coordinate or a three-dimensional coordinate, of the surface of a frustum of a cone corresponding to the central point of each mark is obtained through measurement. two-dimensional coordinates ($x_c$, $y_c$) and three-dimensional coordinates ($x_w$, $y_w$, $z_w$) of the mark center in a coordinate system of the frustum of the cone can be directly measured by a two-dimensional or three-dimensional coordinate measuring instrument. and a three-dimensional scanner may also be used to scan a three-dimensional point cloud of the mark points and other parts of the surface of the frustum of the cone to obtain three-dimensional coordinates ($x_w$, $y_w$, $z_w$) of the mark points relative to the coordinate system of the frustum of the cone.

Using an image measurement technology, the position of the surface of the frustum of the cone corresponding to the center point of the mark can be determined according to the imaging parameters: let the coordinates of the mark center image be (u, v), then the transformation formula between them and the world coordinates ($x_w$, $y_w$, $z_w$) is as follows:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix}$$

As shown in the above equation, the first matrix on the right is the in-camera parameter matrix and the second matrix is the out-camera parameter matrix. the internal reference matrix and external reference matrix of the camera can be acquired by camera calibration methods such as Zhang Zhengyou's calibration. ($x_w$, $y_w$, $z_w$) in the above formula is used to represent the three-dimensional point coordinates corresponding to the surface of the frustum of the cone and the mark center, and s is a Z coordinate having a central point in a camera coordinate system, (u, v) is an image coordinate of the center, ($f_x$, $f_y$) is an equivalent focal length of the camera, ($c_x$, $c_y$) is an image main point, $r_{ij}$ (i, j=1, 2, 3) a rotation matrix R element, $t_i$=(1, 2, 3) is a translation vector, and ($x_w$, $y_w$, $z_w$) represents a three-dimensional point coordinate corresponding to the surface of the object and the mark center.

S42: performing real-time imaging on the surface of the object to obtain a real-time to-be-measured image.

S43: performing mark detection on the real-time to-be-measured image, and confirming mark numbers corresponding to the marks in the real-time to-be-measured image based on vector comparison, where specifically, real-time imaging is performed on the surface of the frustum of the cone, mark detection and localization is performed on the real-time image (the detection process is the same as S3), the mark number corresponding to the current mark is confirmed, and the corresponding coordinate of the real-time image center on the reference image is calculated. and the steps are specifically as follows: mark detection confirmation: according to the PCA dimensionality reduction criterion, a 10-component one-dimensional vector is obtained from reducing the dimensions of the feature image of the current mark, and the vector is compared with the one-dimensional vectors of all the marks in the reference image, and the mark number with the maximum similarity in the reference image is taken as the current mark number. and the similarity C of two vectors $\{a_i\}$ and $\{b_i\}$ is represented as:

$$C = \sum_{i=0}^{9} (a_i - b_i)^2$$

A position of the real-time image center on the reference image is determined based on the mark localization: let the coordinates of the detected mark on the real-time image on the real-time image be ($x_r$, $y_r$) the No n. mark on the reference image is determined according to the similarity of the mark vector, and the coordinates of the No. n mark (center) on the reference image be ($x_n$, $y_n$), then the coordinates ($u_c$, $v_c$) of the center of the real-time image on the reference image is obtained according to the mark:

$$\begin{cases} u_c = x_n - u_r + \text{width}/2 \\ v_c = y_n - v_r + \text{height}/2 \end{cases}$$

where width and height are the pixel width and height of the real-time image, respectively.

As a further preferred example of the method, the step of calculating a position of the surface of the object corresponding to the current real-time to-be-measured image according to the position of the to-be-measured marks in the real-time to-be-measured image and the position information of the surface of the object corresponding to the marks specifically includes:

S51: acquiring the corresponding coordinate of the real-time image center on the reference image according to the mark number.

S52: determining a point of the surface of the object corresponding to the real-time image center according to the corresponding relationship between a pixel coordinate of the reference image and a parameter of the surface of the object and a coordinate of the real-time image center on the reference image. and S53: obtaining a position of the surface of the object corresponding to the current real-time to-be-measured image according to the point of the surface of the object corresponding to the real-time image center, where specifically, after obtaining the coordinate ($u_c$, $v_c$) (of the real-time image center on the reference image, a point of the surface of the object corresponding to the real-time image center can be determined according to the corresponding relationship between the pixel coordinate of the reference image and a parameter of the surface of the object.

When the surface of the object is a plane, the two-dimensional coordinate ($u_c$, $v_c$) of the surface of the object corresponding to the real-time image center ($x_c$, $y_c$) can be represented as:

$$\begin{cases} x_c = au_c + bv_c + c \\ y_c = du_c + ev_c + f \end{cases}$$

According to the two-dimensional coordinates ($x_c$, $y_c$) of the surface of the object, parameters such as the displacement of the corresponding point in the center of the real-time image can be directly calculated.

For a frustum of a cone, the direction of the reference image v corresponds to the height direction of the rotation shaft of the frustum of the cone, the direction of the reference image u corresponds to the rotation angle of the frustum of the cone, and a point ($\theta_c$, $h_c$) of the surface of the object corresponding to the real-time image center ($u_c$, $v_c$) is represented as:

$$\begin{cases} \theta_c = av_c \\ h_c = bv_c \end{cases}$$

where the position of the surface of the object corresponding to the current real-time to-be-measured image includes a one-dimensional coordinate, a two-dimensional coordinate, a three-dimensional coordinate, a one-dimensional rotation angle and a two-dimensional rotation angle.

According to a point ($\theta_c$, $h_c$) of the surface of the object corresponding to the center ($u_c$, $v_c$) of the real-time image, changes in the one-dimensional angle and two-dimensional angle can be calculated:

The corresponding relationship between the image position and the one-dimensional rotation angle of the object: let the circumference of the frustum of the cone be L, the axis direction of the frustum of the cone be the direction x, the circumference direction of the frustum of the cone be the direction y, let the pixel coordinate of the image center be (u, v), and the corresponding two-dimensional coordinate of the surface of the object be ($x_c$, $y_c$), then the rotation angle corresponding to this point is:

$$\theta = \frac{y_c - y_0}{L} * 360°$$

In the above formula, $\theta$ is a rotation angle of a to-be-measured rotating body, $y_0$ is an origin of a circumferential line of an external surface expansion of the rotating body, $y_c$ is a coordinate point of the identification center of the external surface expansion of the rotating body, and L is a length of a circumferential line of the external surface expansion of the rotating body.

A corresponding relationship between image position and spherical two-dimensional rotation angle (longitude and latitude): the image center coordinate is (u, v) corresponding to the world coordinate ($x_w$, $y_w$, $z_w$) on the spherical surface, and assuming that the world coordinate system takes the spherical center as the origin, the longitude and latitude are:

$$\begin{cases} \alpha = atan\left(\frac{\sqrt{x_w^2 + y_w^2}}{\sqrt{x_w^2 + y_w^2 + z_w^2}}\right) \\ \beta = atan\left(\frac{x_w}{y_w}\right) \end{cases}$$

In the above formula, the coordinate of image center is (u, v) corresponding to a world coordinate on the surface of the to-be-measured sphere, which is recorded as ($x_w$, $y_w$, $z_w$), and $\alpha$ is the longitude of the to-be-measured sphere, and $\beta$ is the latitude of the to-be-measured sphere.

One-dimensional angle change: the one-dimensional angle change of the object corresponding to the image center during two real-time imaging is calculated as follows:

$$\Delta\theta = \theta_{c1} - \theta_{c2} = au_{c1} - au_{c2}$$

Two-dimensional angle change: the two-dimensional angular change of the sphere surface corresponding to the image center (assuming that the origin is at the center of the sphere and the radius of the sphere is r) during two real-time imaging is calculated as follows:

$$\begin{cases} \Delta\theta = \theta_{c1} - \theta_{c2} = au_{c1} - au_{c2} \\ \Delta\varphi = atan\left(\frac{h_{c1}}{r}\right) - atan\left(\frac{h_{c2}}{r}\right) = atan\left(\frac{bv_{c1}}{r}\right) - atan\left(\frac{bv_{c2}}{r}\right) \end{cases}$$

The disclosure has the following advantages:
1. The measurement according to the present disclosure is based on the actual position of the surface marks of the to-be-measured object, as opposed to the grating technique and the imaging encoder technique based on theoretical position of the scale and marks. According to the present disclosure, the actual position of each mark relative to the to-be-measured object can be obtained with high precision by measuring the random texture information and marks after being made, and then the surface of the object can be localized and measured according to the actual position (rather than theoretical position) of the marks to avoid the influence of machining errors and installation errors and other factors of the marks on the measurement accuracy. This measurement not only has high precision and good reliability, but also greatly reduces the requirements for processing technology and device materials.
2. With respect to the technology of information ring identification, according to the present disclosure, the production of random speckle information and marks (spraying, pasting) can be directly made on the object, without the need to produce and install an information ring, without the need of high-precision processing and making coded marks, and the method is simpler and more economical.
3. Compared to the information ring that can only perform measurement for cylinders with the rotation angle being measured by measuring the one-dimensional displacement of the cylinder side, the present disclosure can be directly applied to the surface displacement measurement and rotation angle measurement of a frustum of a cone (both side surfaces and upper and lower bottom surfaces), cones, discs, and any irregular revolved bodies.
4. Compared to the information ring identification and double-camera measurement technology with the traversal search image localization method being inefficient and difficult to be used for real-time fast measurement, the present disclosure provides a method for directly detecting and identifying a mark to perform image localization, which does not need to perform a traversal search on all pixels of a reference image at the time of image localization, and has the advantages of high execution efficiency, good real-time performance and being simple and reliable.
5. Compared with the single mark encoding measurement mode adopted by the imaging encoder and the information ring mark, the present disclosure uses simple patterns (such as points, lines and cross wires) without coding and can also be compatible with encoded marks, which not only makes the processing and making of marks easier and more convenient, completely avoids the requirement of high-precision processing, but also enables the imaging range of the camera to be smaller, thereby achieving higher measurement accuracy.

6. Compared with the double-camera measurement scheme, the present disclosure only needs to use a single camera to realize the identification and localization of the mark points on the surface of the object, so that the whole measurement process is simpler and more efficient.

7. The present disclosure can also be used for measuring parameters such as two-dimensional translation, three-dimensional translation, and two-dimensional rotation angle based on the existing technology which can only measure one-dimensional rotation angle and one-dimensional displacement with high precision.

Figure 2:
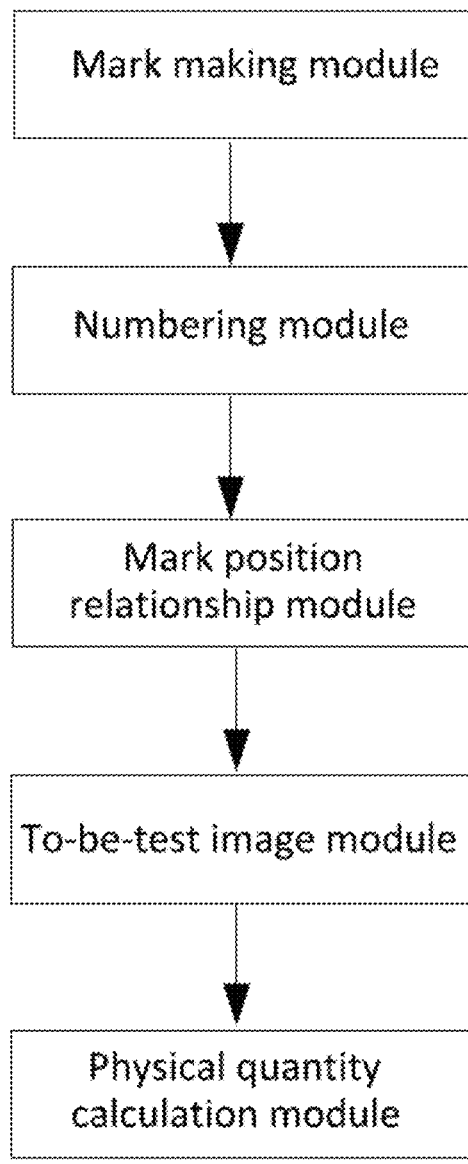
FIG. 2 is a structural block diagram showing a system for high-precision localization of a surface of an object according to the present disclosure.

As shown in FIG. 2, a system for high-precision localization of a surface of an object includes:
  a mark making module configured to make marks with a pre-set distribution density on the surface of the object to obtain a marked object.
  a numbering module configured to photograph the marked object and number marks in an image to obtain an image with numbered marks.
  a mark position relationship module configured to acquire relative position information about each mark on the surface of the object according to the image with the numbered marks and establish a corresponding relationship between the mark numbers and the mark position information.
  a to-be-measured image module configured to acquire a real-time to-be-measured image and detect marks in the real-time to-be-measured image to obtain to-be-measured marks. and
  a physical quantity calculation module configured to calculate a position of the surface of the object corresponding to the current real-time to-be-measured image according to the position of the to-be-measured marks in the real-time to-be-measured image and the position information of the surface of the object corresponding to the marks.

All the above-described method examples are applicable to the present system examples, and the functions specifically realized by the present system examples are the same as those of the above-described method examples, and the beneficial effects achieved by the present system examples are the same as those achieved by the above-described method examples.

The preferred examples of the present disclosure have been described specifically above, and the present disclosure are not limited thereto. A person skilled in the art may carry out various equivalent modifications or substitutions without departing from the spirit of the disclosure, and all these equivalent modifications or substitutions fall into the scope defined in the claims of this application.

What is claimed is:

1. A method for high-precision localization of a surface of an object, comprising:
  making marks with a pre-set distribution density on the surface of the object to obtain a marked object, wherein making the marks further comprises:
    engraving the marks on the surface through a mark making method using the marks of a pre-set pattern to obtain the marked object, wherein the marks of the pre-set pattern comprise a line segment, a point, a circle, a square, a cross, and a shape of combination thereof;
    the mark making method comprises laser engraving, printing, and etching; and
    the marks have an engraving pitch less than half of an image frame;
  photographing the marked object and numbering the marks in an image to obtain an image with numbered marks, wherein photographing the marked object and numbering the marks in an image to obtain the image with numbered marks further comprises:
    photographing and imaging the surface of the marked object to obtain a surface image;
    processing the surface image through threshold segmentation to detect and obtain one or more target centers of all the marks in the surface image;
    taking the one or more target centers as a reference point, taking the image of a pre-set pixel size as a mark feature image of the corresponding marks;
    establishing a corresponding relationship between the mark feature image and the image with numbered marks using the principal component analysis method, reducing the mark feature image to a low dimension, and taking first 10 principal components of a principal component matrix as a one-dimensional vector representing the marks to determine a unique number; and
    obtaining an image of the surface with numbered marks;
  acquiring a relative position information about each of the marks on the surface of the object according to the image with the numbered marks and establishing a corresponding relationship between the image with numbered marks and the relative position information of each of the marks;
  acquiring a real-time to-be-measured image and detecting marks in the real-time to-be-measured image to obtain to-be-measured marks; and
  calculating a position of the surface of the object corresponding to the real-time to-be-measured image according to the position of the to-be-measured marks in the real-time to-be-measured image and the relative position information of the surface of the object corresponding to the marks.

2. The method for high-precision localization of the surface of the object according to claim 1, wherein acquiring the relative position information about each of the marks on the surface of the object according to the image with the numbered marks and establishing a corresponding relationship between the image with numbered marks and the relative position information of each of the marks further comprises:
  performing image stitching on the image with numbered marks through an image stitching method to obtain a complete surface image;
  taking the complete surface image as a reference image and establishing a relationship between one or more image pixel coordinates of the reference image and the actual coordinates of the surface of the object; and
  identifying and localizing the marks on the reference image, and determining the corresponding relationship between each of the marks and a coordinate of the surface of the object according to the relationship between the one or more image pixel coordinates of the reference image and the actual coordinate of the surface of the object.

3. The method for high-precision localization of the surface of the object according to claim 2, wherein acquiring the real-time to-be-measured image and detecting the marks in the real-time to-be-measured image to obtain the real time to-be-measured marks further comprises:
  determining a precise position of each mark central point on the surface of the object according to a transformation formula;
  performing real-time imaging on the surface of the object to obtain the real-time to-be-measured image; and
  performing mark detection on the real-time to-be-measured image, and confirming the to-be-measured marks corresponding to the marks in the real-time to-be-measured image based on a vector comparison.

4. The method for high-precision localization of the surface of the object according to claim 3, wherein the transformation formula is as follows:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix}$$

wherein, in the above transformation formula, s is a Z coordinate having the mark central point on the surface of the object in a camera coordinate system, (u, v) is an image coordinate of the center, $(f_x, f_y)$ is an equivalent focal length of the camera, $(c_x, c_y)$ is an image main point, $r_{ij}$=(i, j=1, 2, 3) is a rotation matrix R element, $t_i$=(i=1, 2, 3) is a translation vector, and $(x_w, v_w, z_w)$ represents a three-dimensional point coordinate corresponding to the surface of the object and the mark central point on the surface of the object.

5. The method for high-precision localization of the surface of the object according to claim 4, wherein calculating the position of the surface of the object corresponding to the real-time to-be-measured image according to the position of the to-be-measured marks in the real-time to-be-measured image and the relative position information of the surface of the object corresponding to the marks further comprises:
  acquiring corresponding coordinate of a real-time image center on the reference image according to the image with numbered marks;
  determining a point of the surface of the object corresponding to the real-time image center according to the corresponding relationship between the one or more image pixel coordinate of the reference image and a parameter of the surface of the object and a coordinate of the real-time image center on the reference image; and
  obtaining a position of the surface of the object corresponding to the real-time to-be-measured image according to the point of the surface of the object corresponding to the real-time image center,
  wherein the position of the surface of the object corresponding to the real-time to-be-measured image comprises a one-dimensional coordinate, a two-dimensional coordinate, a three-dimensional coordinate, a one-dimensional rotation angle, and a two-dimensional rotation angle.

6. The method for high-precision localization of the surface of the object according to claim 5, wherein a the one-dimensional rotation angle is calculated using a calculation formula which is as follows:

$$\theta = \frac{y_c - y_0}{L} * 360°$$

wherein in the above calculation formula, θ is a rotation angle of a to-be-measured rotating body, $y_0$ is an origin of a circumferential line of an external surface expansion of the to-be-measured rotating body, $y_c$ is a coordinate point of the identification center of the external surface expansion of the to-be-measured rotating body, and L is a length of a circumferential line of the external surface expansion of the to-be-measured rotating body.

7. The method for high-precision localization of the surface of the object according to claim 6, wherein the calculation formula of the two-dimensional rotation angle is as follows:

$$\begin{cases} \alpha = a\tan\left(\frac{\sqrt{x_w^2 + y_w^2}}{\sqrt{x_w^2 + y_w^2 + z_w^2}}\right) \\ \beta = a\tan\left(\frac{x_w}{y_w}\right) \end{cases}$$

wherein in the above calculation formula, the coordinate of the image center is (u, v) corresponding to a world coordinate on the surface of the to-be-measured sphere, which is recorded as $(x_w, v_w, z_w)$; and α is the longitude of the to-be-measured sphere, and β is the latitude of the to-be-measured sphere.

8. A system for high-precision localization of a surface of an object, comprising:
  a mark making module configured to make marks with a pre-set distribution density on the surface of the object to obtain a marked object, wherein the mark making module is further configured to:
  engrave the marks on the surface through a mark making method using the marks of a pre-set pattern to obtain the marked object, wherein
    the marks of the pre-set pattern comprise a line segment, a point, a circle, a square, a cross, and a shape of combination thereof;
    the mark making method comprises laser engraving, printing, and etching; and
    the marks have an engraving pitch less than half of an image frame,
  a numbering module configured to photograph the marked object and number marks in an image to obtain an image with numbered marks, wherein the numbering module further comprises:
  photograph and image the surface of the marked object to obtain a surface image;
  process the surface image through threshold segmentation to detect and obtain one or more target centers of all the marks in the surface image;
  take the one or more target centers as a reference point, taking the image of a pre-set pixel size as a mark feature image of the corresponding marks;
  establish a corresponding relationship between the mark feature image and the image with numbered marks using the principal component analysis method, reducing the mark feature image to a low dimension, and taking first 10 principal components of a principal component matrix as a one-dimensional vector representing the marks to determine a unique number; and
  obtain an image of the surface with numbered marks;
  mark position relationship module configured to acquire relative position information about each of the mark on the surface of the object according to the image with the numbered marks and establish a corresponding relationship between the image with numbered marks and the relative position information of each of the marks;

a to-be-measured image module configured to acquire a real-time to-be-measured image and detect marks in the real-time to-be-measured image to obtain to-be-measured marks; and;

a physical quantity calculation module configured to calculate a position of the surface of the object corresponding to the real-time to-be-measured image according to the position of the to-be-measured marks in the real-time to-be-measured image and the relative position information of the surface of the object corresponding to the marks.

* * * * *